United States Patent [19]

Gage

[11] Patent Number: 5,519,679
[45] Date of Patent: May 21, 1996

[54] APPARATUS AND METHOD FOR MULTI-SPOT SAMPLED TRACKING IN AN OPTICAL DATA STORAGE SYSTEM

[75] Inventor: Edward C. Gage, Fairport, N.Y.

[73] Assignee: Eastman Kodak Company, Rochester, N.Y.

[21] Appl. No.: 322,659

[22] Filed: Oct. 12, 1994

[51] Int. Cl.$^6$ ................................................. G11B 7/085
[52] U.S. Cl. .................... 369/44.34; 369/44.37; 369/44.26
[58] Field of Search ....................... 369/44.37, 44.38, 369/44.26, 44.34, 116, 13, 120, 121, 44.23, 110, 44.31, 54; 250/201.5

[56] References Cited

U.S. PATENT DOCUMENTS

| | | | |
|---|---|---|---|
| 4,617,654 | 10/1986 | Gross et al. | 369/124 |
| 4,660,191 | 4/1987 | Maeda et al. | 369/46 |
| 4,750,162 | 6/1988 | Tajima | 369/46 |
| 4,775,968 | 10/1988 | Ohsato | 369/46 |
| 4,787,076 | 11/1988 | Deguchi et al. | 369/46 |
| 4,881,214 | 11/1989 | Izawa et al. | 369/44 |
| 5,073,884 | 12/1991 | Kobayashi | 369/44.37 |
| 5,138,592 | 8/1992 | Fujita | 369/44.13 |
| 5,140,577 | 8/1992 | Ohsato | 369/437 |
| 5,159,589 | 10/1992 | Ohsato | 369/44.35 |
| 5,168,487 | 12/1992 | Ohsato et al. | 369/44.37 |
| 5,191,571 | 3/1993 | Fukumoto et al. | 369/44.37 |
| 5,212,675 | 5/1993 | Yoshino et al. | 369/44.36 |
| 5,216,652 | 6/1993 | Yoshio et al. | 369/44.37 |
| 5,222,057 | 6/1993 | Suzuki et al. | 364/44.26 |
| 5,235,584 | 8/1993 | Yoshio et al. | 369/44.29 |
| 5,280,466 | 1/1994 | Tomita | 369/44.26 X |
| 5,282,188 | 1/1994 | Gage | 369/110 |
| 5,303,216 | 4/1994 | Shinoda et al. | 369/44.13 |
| 5,392,271 | 2/1995 | Matsui | 369/120 X |

FOREIGN PATENT DOCUMENTS

| | | | |
|---|---|---|---|
| 0298931 | 12/1987 | Japan | 369/44.34 |
| 0050245 | 2/1989 | Japan | 369/44.34 |

OTHER PUBLICATIONS

A. Marchant, "Optical Recording: A Technical Overview," Addison–Wesley, Reading, Mass., 1990, pp. 172–181.
Data Sheet, SDL–5600 Series Multi–Beam Separately–Addressed Laser Diodes, SDL (Spectra Diode Labs) Inc., San Jose, Calif.
Data Sheet, VPS700 lens, Blue Sky Research, San Jose, Calif. Sep. 1992.

Primary Examiner—Aristotelis Psitos
Assistant Examiner—Thang V. Tran
Attorney, Agent, or Firm—Raymond L. Owens

[57] ABSTRACT

An apparatus and method for providing a sampled tracking error signal in an optical system using multiple illumination spots. An optical source generates radiation which is applied to a storage medium to produce a first illumination spot, a second illumination spot and a third illumination spot thereon. A return beam resulting from application of the radiation to the medium is detected, and a data signal is generated from the detected return beam. A sampled tracking error signal is generated from a first sample of the data signal, taken when the second spot illuminates a portion of a tracking mark, and a second sample of the data signal, taken when the third spot illuminates another portion of a tracking mark. The data signal samples may be normalized to samples of a source monitor signal. The data signal may be generated from magneto-optic, write-once, or other types of optical storage media.

23 Claims, 4 Drawing Sheets

APPARATUS AND METHOD FOR MULTI-SPOT SAMPLED TRACKING IN AN OPTICAL DATA STORAGE SYSTEM

FIELD OF THE INVENTION

The present invention relates generally to optical data storage systems. More particularly, the present invention relates to an improved apparatus and method for generating a tracking error signal in a multi-spot optical storage system.

BACKGROUND OF THE INVENTION

Tracking error signals are used in optical storage systems to control the position of an incident read and/or write radiation beam with respect to a data track on an optical storage medium. Most systems use either a phase tracking or a density tracking technique to detect the positional error between the incident radiation beam and the data track.

Phase tracking typically involves detecting variations in diffraction patterns resulting from interaction between the incident beam and the medium. The diffraction pattern variations may result from movement of the incident beam relative to a pre-formed diffracting structure, often referred to as a groove, pregroove or guide track, on the medium surface. Other phase tracking techniques use diffraction pattern variations resulting from movement of the incident beam relative to preformatted tracking marks, also referred to as servo marks, placed on or near the data tracks of, for example, a phase-change or ablative medium. Exemplary phase tracking techniques, including those commonly referred to as push-pull tracking and sampled phase tracking, are described in pp. 172–178 and 180–181 of A. Marchant, "Optical Recording: A Technical Overview," Addison-Wesley, Reading, Mass., which are incorporated by reference herein. Known phase tracking techniques, however, typically suffer from a number of disadvantages. For example, phase tracking systems may require additional optics and/or detectors in the return path, and nay be sensitive to phantom tracking, which refers to false error signals resulting from changes in the relative positions of the incident beam and an objective lens used to focus the beam on the medium.

In density tracking, a density signal is detected which typically corresponds to an amount of incident radiation falling on and reflected by a given data mark or tracking mark. Exemplary density tracking techniques include multi-spot tracking, wobble tracking, or sampled density tracking. Both multi-spot tracking and wobble tracking may also be implemented as phase tracking techniques, by detecting variations in diffraction patterns produced by the wobbled or multi-spot incident beams, respectively, rather than a density signal.

Multi-spot tracking, also referred to as outrigger tracking, generally uses a single optical source and multiple illumination spots to generate a tracking error signal. An exemplary phase-type multi-spot tracking system is described in U.S. Pat. No. 4,787,076 and uses a diffraction grating in the incident beam path to produce three spots, corresponding to diffraction orders 0, +1 and −1, from a single beam. The three spots include a main beam spot for reading and/or writing data on a medium, and two auxiliary beam spots, or outrigger spots, offset in both in-track and cross-track directions from the main beam spot. The diffraction patterns resulting from application of the two auxiliary beam spots to the edges of a pregroove on a magneto-optic medium are detected and processed to provide a phase-type tracking error signal. Such prior art multi-spot tracking systems, however, suffer from a number of drawbacks. For example, the use of a grating to generate multiple spots substantially reduces optical head efficiency and in some cases may require precise alignment of optical components. In addition, separate detectors are usually required for each of the three spots, resulting in a higher component count and increased optical head cost and complexity. Furthermore, both phase-type and density-type multi-spot tracking techniques may produce a tracking error signal which is overly sensitive to the presence of neighboring tracks. Further detail regarding outrigger tracking may be found in, for example, pp. 178–180 of the above-cited A. Marchant reference, which are incorporated by reference herein.

On a magneto-optic storage medium, data is generally stored in the form of marks having a distinct magnetization, such that an incident radiation beam reflected from the medium can detect the marks and thereby the recorded data. Most commercially-available magneto-optic storage media include a pregroove which, as noted above, is suitable for generating a phase tracking error signal. Without either a pregroove or a previously-recorded data track from which variations in diffraction or reflection can be measured in, for example, a multi-spot system, magneto-optic media are generally unable to generate a suitable phase or density tracking error signal. Furthermore, it is generally difficult to optimize a magneto-optic system to simultaneously provide both a phase tracking error signal and a read-out data signal of sufficiently high quality.

Other types of optical media can generate phase tracking error signals without the need for a pregroove or a recorded data track. For example, a number of known write-once optical media utilize the above-mentioned preformatted tracking marks to generate a sampled phase tracking error signal. As used herein, write-once media include read-only media, such as compact disks (CDs), which are often reproduced in mass quantities from a master recording. In general, however, tracking marks have not been used to provide tracking error signals for magneto-optic media. The tracking signal schemes used for non-grooved magneto-optic media are thus often incompatible with those used for other types of non-grooved media, such as non-grooved write-once media. As a result, many optical storage media drives may be unable to handle both magneto-optic and write-once optical media. Multi-function optical drives may not be practical unless techniques are developed which allow, for example, magneto-optic media to operate using tracking error signals similar to those used for write-once media.

As is apparent from the above, a need exists for improved density-type tracking error signal generation in multi-spot optical systems such that accurate tracking is provided on a variety of different types of media, including both magneto-optic and write-once media, without requiring separate tracking detectors, a media pregroove or a previously-recorded data track.

SUMMARY OF THE INVENTION

The present invention provides an apparatus and method which use multiple illumination spots to perform density-type sampled tracking in an optical head. The tracking error signal can be generated without the use of a pregroove, and regardless of whether the media type is, for example, magneto-optic or write-once. An exemplary apparatus in accordance with one aspect of the present invention may include an optical source to generate radiation which is applied to the medium to produce a first illumination spot, a second illumination spot and a third illumination spot thereon; means for generating a data signal from a return beam resulting from application of the radiation to the medium; means for sampling the data signal to obtain a first data signal sample when the second spot illuminates a portion of a tracking mark and a second data signal sample when the third spot illuminates another portion of a tracking mark; and means for generating from the first and second data signal samples a tracking error signal indicative of the position of the first spot relative to a data track of the medium. The data signal samples may be normalized to corresponding samples of a front facet monitor signal or other source monitor signal. The means for generating a data signal may include detectors and signal combiners suitable for generating, for example, a differential data signal from a magneto-optic medium or a sum data signal from a write-once medium.

In accordance with another aspect of the present invention, a method is provided which may include the steps of generating radiation to produce a first, a second and a third illumination spot on the medium; detecting a return beam resulting from application of the radiation to the medium; generating a data signal from the detected return beam; sampling the data signal when the second spot illuminates a portion of a tracking mark to obtain a first data signal sample; sampling the data signal when the third spot illuminates another portion of a tracking mark to obtain a second data signal sample; and generating a tracking error signal from the first and second data signal samples.

The multi-spot sampled tracking of the present invention provides a number of advantages over prior art tracking techniques. These advantages include increased optical head efficiency, a reduced number of optical components and detectors, and fewer alignment operations in the optical head assembly process. In addition, the tracking of the present invention can be made insensitive to errors arising from phantom tracking or the presence of neighboring data tracks. Furthermore, the present invention may be utilized with a variety of different types of non-grooved media, including both magneto-optic and write-once media, and is therefore particularly useful in a multi-function optical disk drive.

Further features of the invention, its nature and various advantages will become more apparent from the accompanying drawings and following detailed description of the invention.

DETAILED DESCRIPTION OF THE INVENTION

Figure 1:
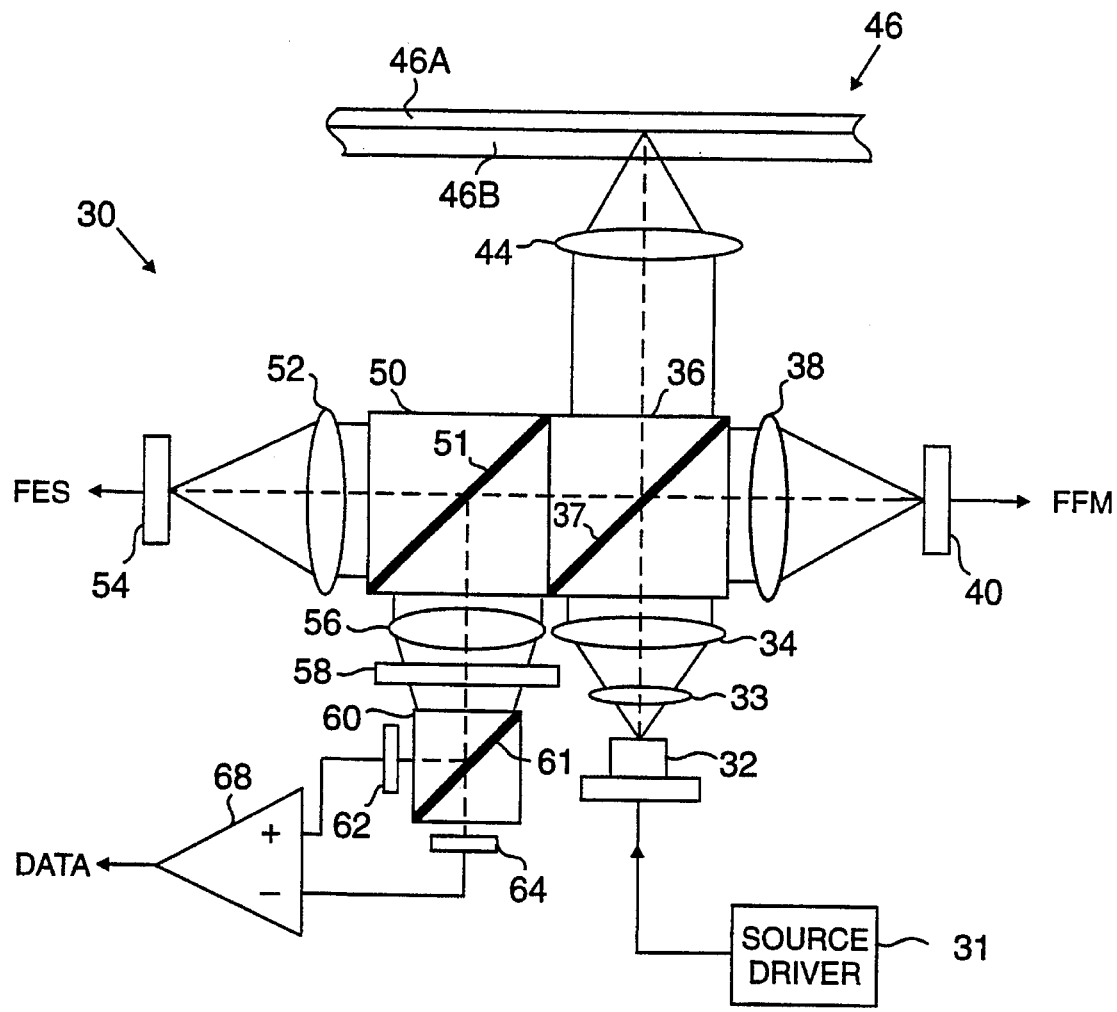
FIG. 1 is an exemplary optical storage system with multi-spot sampled tracking in accordance with the present invention.

FIG. 1 illustrates an exemplary optical storage system 30 with multi-spot sampled tracking in accordance with the present invention. The system 30 will be described primarily in terms of its operation with a magneto-optic medium, although it will be recognized that the system may also be used with other types of storage media. Multiple radiation beams are generated by an optical source 32, which may be, for example, a multi-beam laser diode, laser or LED. The source may be driven by control signals supplied from a source driver 31, as will be discussed in greater detail below in conjunction with FIG. 4. Although the multiple beams may also be generated by a number of separate single-beam optical sources, the use of a single multi-beam source is preferred in part because it facilitates proper spacing of the beam illumination spots on an optical medium. Suitable multi-beam laser diodes include the SDL-5600 series manufactured by SDL, Inc. (formerly Spectra Diode Labs) of San Jose, Calif. In the exemplary embodiment of the present invention described below, it will be assumed that the optical source 32 is a multi-beam laser diode source providing three separate radiation beams, each at a wavelength of about 780 nanometers and with a maximum output power of about 20 mW. Of course, it will be readily apparent to those skilled in the art that many variations may be made in the number of beams, the beam wavelengths and the beam power levels as required in a given application.

Each of the three radiation beams are preferably separately-controllable using different control signals supplied from the source driver 31. The control signals may turn a given beam on and off, as well as supply, for example, a drive current suitable for setting the output power level of a given beam. As will be described in greater detail below in conjunction with FIGS. 2A–2C, a first illumination spot, produced in this embodiment by the first beam, is used to read and/or write data marks on data tracks of the medium. Second and third illumination spots, produced in this embodiment by the second and third beams, respectively, provide a sampled tracking error signal generated by taking samples of a data signal measured when the second and third spots illuminate regions of the medium. The regions of the medium illuminated by the second and third spots may be, for example, preformatted tracking marks interspersed with data marks on a data track. Although the first beam may remain on continuously while the second and third beams are turned on and off during sampling of the data signal, in a preferred embodiment of the present invention each of the beams are turned on and off at appropriate times such that only one of the beams is on at a given time. The three radiation beams will also be referred to collectively herein as a multi-spot radiation beam, multi-spot radiation, or simply radiation. It should be emphasized that a multi-spot beam in accordance with the present invention may include all three separate beams on simultaneously, only a single beam on at a given time, or various combinations of the three beams on simultaneously.

A circularizing lens 33 may be aligned and mounted in front of optical source 32 to substantially circularize the radiation beams passing therethrough. A radiation beam from an optical source such as a laser diode generally has an elliptical cross-section. When such a radiation beam is circularized, it becomes rotationally symmetric about its optical axis, and exhibits a generally circular cross-section. The lens 33 permits use of a collimating lens with a longer focal length such that close spacing of the illumination spots on the medium is facilitated. The lens 33 also further improves the throughput efficiency of the system 30 in part because less light must be truncated from the radiation beams to produce a reasonably round focused spot at the medium surface. The lens 33 is preferably an anamorphic lens and may be, for example, a model VPS700 lens available from Blue Sky Research of San Jose, Calif. Alternative beam shaping optics, including beam expansion prisms or cylinder lenses, could be used elsewhere in the optical path of the incident beam in place of lens 33.

The radiation beams from source 32 are then collimated by collimating lens 34, which is preferably a low numerical aperture (NA) lens suitable for collecting and closely spacing the multiple beams. A low NA refers to an NA which is lower than that of an objective lens used to focus the beams on the medium, such that demagnification of the beams occurs, resulting in closer beam spacing at the medium than at the source. The significance of the relative beam spacings will be described in greater detail below in conjunction with FIGS. 2A–2C. A suitable collimating lens in the system of FIG. 1 is one with a focal length of about 16 mm, although any of a number of other lenses could be used. The collimated radiation beams are transmitted through a polarization beam splitter 36 which may have an s-polarization reflectivity of about 100% and a p-polarization reflectivity of about 25%, indicating that 100% and 25% of the s-polarization and p-polarization, respectively, of the incident radiation beams are reflected by a surface 37, and the remaining portions of the beams are transmitted through the surface 37. The beam splitter 36 could also be a beam splitter/expander suitable for providing additional beam shaping as required in a given application. A portion of each radiation beam is thus reflected by surface 37 of beam splitter 36 toward a detector focusing lens 38 and thereby focused onto a front facet detector 40. The reflected portions of the linearly-polarized radiation beams include both s-polarized and p-polarized components, as noted above, and are detected in detector 40 to provide an indication of the intensity levels of the incident radiation beams. Signals from detector 40 are used, as will be described below, to normalize samples of the detected data signal to variations in the radiation beam intensity levels and can also be used in a source power servo loop (not shown) to maintain the radiation beam output power levels of source 32 at desired values.

The portions of the incident radiation beams which are not reflected by surface 37 to front facet detector 40 pass through surface 37 and are incident on an objective lens 44. The surface 37 of polarization beam splitter 36 transmits a linear p-polarized portion of the radiation beams, which is perpendicular to the s-polarized portions of the radiation beams reflected by surface 37. The direction of the beams may be altered by including additional optical elements which are not shown, such as a turning prism or a fully-reflecting mirror, between the beam splitter 36 and the objective lens 44. For example, a turning prism or reflecting mirror could be arranged to reflect the beams by 90° to facilitate placement of the components of system 30 relative to the storage medium in a reduced-height optical disk drive.

Objective lens 44 focuses the three beams onto an optical storage medium 46. The objective lens 44 may have an NA of about 0.55, corresponding to the sine of the half-angle over which the lens 44 can accept incident light. Optical components 33, 34, 36 and 44 represent only an exemplary means of applying radiation to the medium, and any of a number of other arrangements of components could be used as an application means herein. A portion of medium 46 is shown in a side cross-sectional view in FIG. 1. The storage medium 46 typically includes data tracks (not shown) arranged in a spiral or in concentric circles on a data storage surface 46A. The storage medium may also include a transparent substrate 46B which serves as a protective layer over the data storage surface 46A. The exemplary medium 46 does not include a pregroove or similar light-diffracting structure which is typically found on many presently-available magneto-optic media. A data track in accordance with the present invention thus need not coincide with a pregroove, but instead refers generally to an arrangement of data marks, such as a given concentric circle of data marks or a portion of a spiral of data marks, recorded on the surface of a storage medium. A data track may also refer to a portion of a completely or partially unrecorded medium on which such marks are to be written. The first incident radiation beam can be used to read data previously recorded in the form of marks on storage medium 46. The system 30 may also be used to record data on the medium 46 by modifying the power level of the first radiation beam and/or by providing additional recording system elements the placement and operation of which are generally well-known in the art.

The radiation beams applied to the medium have a substantially linear polarization. The interaction with the data storage surface 46A causes the incident radiation beams to be reflected therefrom. The resulting radiation beams, collectively referred to herein as a return beam, generally has an elliptical polarization due to variations produced at the medium surface as a result of, for example, the Kerr effect. It should be emphasized that a return beam in accordance with the present invention may be made up of three different beams, only one of which is on at a given time. The return beam is collimated by objective lens 44, substantially reflected by surface 37 of beam splitter 36, and then applied to a polarization beam splitter 50 which may have an s-polarization reflectivity of about 100% and a p-polarization reflectivity of about 75%. As a result, about 25% of the p-polarized portions of the return beam are transmitted through surface 51 to a detector focusing lens 52. In other embodiments, the amount of p-polarized light transmitted through surface 51 may be between about 10% and 80%. The lens 52 focuses the transmitted portion of the return beam corresponding to the first radiation beam onto a detector 54. The detector 54 may be used to generate a focus error signal from the first radiation beam using any of a number of well-known techniques. The focus error signal may be used in a focus servo loop (not shown) to control the focus position of the incident radiation beams relative to the medium 46 by, for example, adjusting the position of objective lens 44. Although only the first radiation beam is used to generate a focus error signal in this embodiment, other embodiments could also use the second and/or third beam, or various combinations of the three beams, to provide a focus error signal.

The portions of the return beam not transmitted through surface 51 are reflected by surface 51 toward a lens 56 and through a general waveplate 58. The general waveplate 58 rotates the polarization of the portions of the return beam passing therethrough by a given retardance value between about 90° and 180°. The actual retardance value selected may vary with the application. Details regarding selection of an appropriate retardance value for general waveplate 58 in a given embodiment may be found in U.S. Pat. No. 5,282,188, which is assigned to the assignee of the present invention and incorporated by reference herein. In accordance with the present invention, the optimal retardance selected for general waveplate 58 will allow, for example, a magneto-optic system to be optimized for generation of both a data signal and a tracking error signal.

The portions of the return beam reflected by surface 51 and transmitted through waveplate 58 are then applied to another polarization beam splitter 60. A surface 61 transmits, for example, a p-polarization of the return beam and reflects an s-polarization. The beam splitter 60 thus applies return beam components having a given polarization to a first detector 62 and applies return beam components having a polarization perpendicular to the given polarization to a second data detector 64. The polarization beam splitter surfaces 37, 51 and 61 may be, for example, multilayer coatings which reflect and/or transmit desired amounts of s-polarized and p-polarized light. It should be noted that any of a number of alternative magneto-optic type detection arrangements could be used. For example, the polarization beam splitter 60 could be replaced with a Wollaston beam splitter, and the position of detectors 62, 64 could be adjusted such that one detector would receive components of the return beam having an s-polarization while the other receives return beam components having a p-polarization. As another alternative, the general waveplate 58 could be replaced with a phase plate selected to remove phase ellipticity in the return beam, and beam splitter 60 could be a rotatable Wollaston beam splitter rotated to a fixed angle of about 45°.

The data detectors 62, 64 may be used to provide a magneto-optic data signal, which is generally indicative of the data recorded on a magneto-optic medium scanned by the first radiation beam, by applying the detected signal output of the two detectors to inverting and non-inverting inputs of a differential amplifier 68. The amplifier 68 is one type of signal combiner which may be used to generate a data signal in accordance with the present invention. Other signal combiners suitable for taking a difference between the first and second detected signals from detectors 62, 64, respectively, could also be used.

The output of amplifier 68 thus represents a magneto-optic type differential data signal which is generated by detecting a return beam from a magneto-optic medium. An advantage of the present invention, however, is that data and tracking error signal generation are generally independent of media type. The system 30 of FIG. 1 may therefore also be used to generate a write-once sum data signal from, for example, a phase change or ablative write-once medium by summing the detected signals from detectors 62, 64 rather than using amplifier 68 to take their difference. Data signals may thus be generated for both non-grooved magneto-optic media and write-once media in the system of FIG. 1 by appropriate processing of the detected signals from detectors 62, 64. Additional signal combining electronics (not shown) may be used to provide the write-once sum data signal. In an embodiment of the present invention used to generate only a write-once data signal, general waveplate 58, beam splitter 60 and detectors 62, 64 could be eliminated and replaced by, for example, a single detector. Such an embodiment could also include a quarter-wave plate arranged in the path of the incident and return beams, for example, between beam splitter 36 and objective lens 44, as in a conventional write-once system. In alternative write-once embodiments, beam splitter 50 could be eliminated and a detector array could be used to generate both focus error and data signals.

The portion of the optical system 30 which generates, directs and processes the multi-spot incident and return beams is often referred to as an optical head. An optical head herein will also be assumed to include all optical detectors and any signal combining electronics which are used to generate the write-once and differential data signals and the focus error signal. The generation of a tracking error signal in accordance with the present invention generally utilizes additional processing of the data signal produced in the optical head. As will be described below in conjunction with FIG. 4, this additional processing may involve the use of, for example, a microprocessor and memory unit to sample and store, respectively, data signal and source monitor signal values. An advantage of the present invention is that the system of FIG. 1 can be used to generate a tracking error signal without the dedicated tracking detectors required in most prior art optical heads. The tracking error signal of the present invention is referred to as a differential sampled tracking error signal in part because it is derived by taking differences in data signal samples.

Figure 2A:
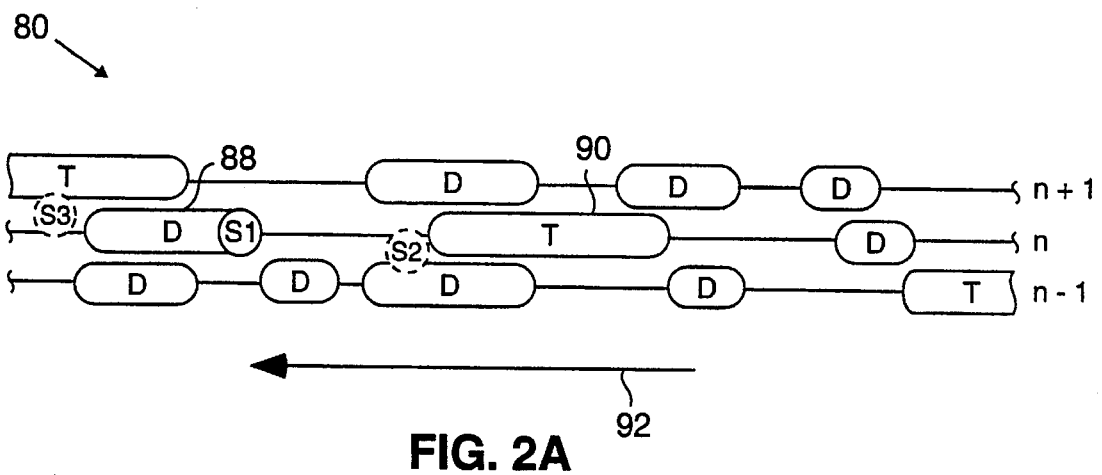
FIGS. 2A–2C illustrate illumination spots produced on data tracks of a non-grooved magneto-optic storage medium by multi-spot radiation generated in the exemplary system of FIG. 1.
Figure 2B:
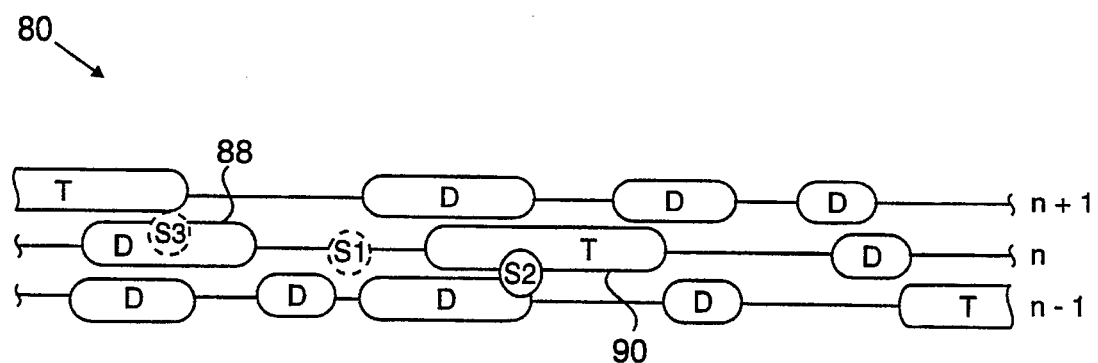
Figure 2C:
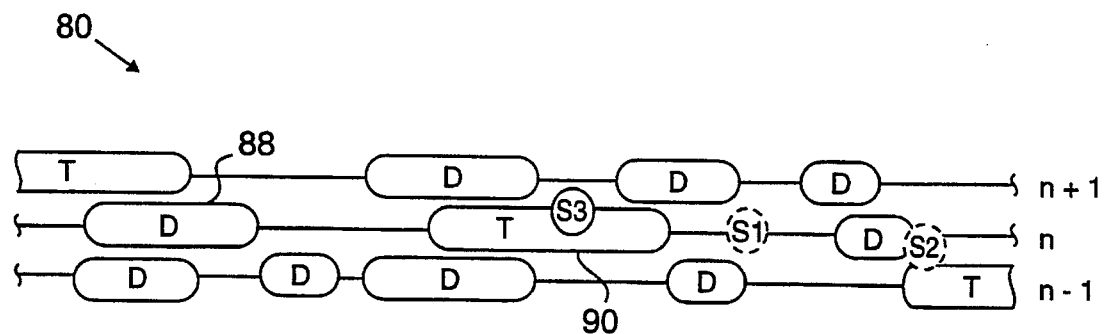

FIGS. 2A–2C show exemplary illumination spots produced on the data storage surface 46A of storage medium 46 as the medium moves relative to the incident beams. The data storage surface 46A of the optical storage medium 46 includes a group 80 of adjacent data tracks designated n, n+1 and n−1. For clarity, only a portion of the many data tracks on a typical storage medium are shown, and a line is drawn through each data track corresponding to the track center line. Although in this example the distance between adjacent tracks, or track pitch, is on the order of about 1.0 to 1.5 μm, the track pitch and other characteristics of the medium will typically depend on the media type and application. The portion of each data track shown includes a plurality of previously-recorded data marks D as well as a tracking mark T. The data marks D may also correspond to regions of the medium surface on which data marks will be recorded by the first beam. The medium and the data tracks thereon move relative to the incident radiation beams in the direction indicated at 92. The tracking marks T represent preformatted marks which can be detected in the manner described herein to provide a tracking error signal. In prior art write-once optical heads, a return beam reflected from the tracking marks is usually detected and processed using separate tracking detectors and signal combining electronics in order to provide the tracking error signal. Prior art magneto-optic heads generally utilize a pregroove, rather than tracking marks suitable for sample tracking, to provide a tracking error signal.

A desired pattern of tracking marks T may be formed on the medium using a formatter or other formatting device in a manner well-known in the art. In the present example, the tracking marks T are spaced on the medium so as to provide a tracking error signal sample about every 50 to 100 μsec, which corresponds to a sampling bandwidth of about 10 to 20 kHz. In an optical storage system in which the media moves at a speed of 10 meters/sec, tracking marks spaced apart by about 500 μm to 1000 μm will provide a tracking error sample about every 50 μsec to 100 μsec. The actual tracking mark spacing and sample period will vary depending upon the application. In the embodiment of FIGS. 2A–2C, the tracking marks T are placed on the data tracks in generally the same position as a data mark, that is, centered on the center line of the track. It should be noted, however, that the type, shape, arrangement and pattern of the tracking marks may also vary in other embodiments. For example, instead of a single tracking mark with different portions thereof illuminated by the second and third illumination spots at different times, dual tracking marks could be located on either side of the data track center line, such that tracking marks on one side of the center line are generally illuminated by the second spot, while tracking marks on the other side are illuminated by the third spot. An example of a dual tracking mark arrangement is shown on p. 180 of the above-cited A. Marchant reference.

FIG. 2A shows multi-spot radiation applied to the data tracks 80 of the medium 46 in the manner described above in conjunction with FIG. 1. The multi-spot radiation produces illumination spots S1, S2 and S3. In this example, the illumination spots have a diameter on the order of 0.7 μm. As noted above, each individual spot resulting from the radiation applied to data tracks 80 is generally not on at all times. In FIGS. 2A–2C, a spot shown in phantom outline is considered to be off while a spot with a solid outline is considered to be on. Both on and off spots are shown in order to illustrate the relative positions of the spots produced by the multi-spot radiation. It should be understood that the terms "on" and "off" as used herein in conjunction with the spots and their corresponding beam or beams are intended to include any situation in which an intensity level of a given beam is increased or substantially reduced, respectively, and not just those in which, for example, the intensity level of a given beam is reduced to zero. The term "on" shall further indicate that a given illumination spot has a sufficient intensity level to, in the case of the first spot S1, read and/or write data marks on the medium, and in the case of the second and third spots S2 and S3, provide a return beam of sufficient intensity such that a sampled tracking error signal may be generated therefrom.

In a preferred embodiment of the present invention, the beam corresponding to spot S1 is turned off when either of the beams corresponding to spots S2 and S3 are on, and the beams corresponding to spots S2 and S3 are both turned off when the beam corresponding to spot S1 is on. FIG. 2A shows a case in which only the first spot S1 is turned on, such that spot S1 may be used to read a recorded data mark 88. A given beam may be turned on or off by, for example, supplying an appropriate drive signal to the corresponding beam control input of multi-beam optical source 32. The spot S1 is focused on and illuminates data mark 88. In the present example, the spot S1 serves as a mad spot for retrieving data previously recorded on the medium 46 in the form of data marks D. The spots S2 and S3 are periodically turned on and off, as will be described below, and are used to generate the tracking error signal which may drive a servo control loop to maintain the proper position of spot S1 on a given data track.

FIG. 2B shows the data tracks of FIG. 2A after the medium has moved a short distance in direction 92 relative to the multi-spot radiation. When the medium 46 is in this position relative to the multi-spot radiation, the beam corresponding to second spot S2 is turned on and illuminates a portion of a tracking mark 90, and the beams corresponding to spots S1 and S3 are turned off. This allows the beam S2 to provide a signal indicative of the position of the multi-spot radiation beam relative to the tracking mark 90. The spot S2 may be turned on for the period of time during which S2 illuminates a portion of the mark 90. This period of time is referred to as the first sample window, because it represents a time during which a sample or samples of the data signal may be taken in order to provide an indication of the position of spot S2 relative to mark 90. The portion of the spot S2 illumination which is reflected by the mark 90 may be determined by monitoring a detected data signal during the first sample window. The spot S2 need not be turned on for the entire sample window, as long as it is on for a sufficient amount of time for a sample to be taken while it illuminates a portion of tracking mark 90. Although in this example the medium 46 moves with respect to the multi-spot beam, the present invention could also be utilized in systems in which the multi-spot beam moves with respect to the medium, such as optical card readers and optical tape readers.

FIG. 2C shows the data tracks of FIG. 2A after the medium has moved an additional short distance in direction 92 relative to the multi-spot radiation. When the medium 46 is in this position, the beam corresponding to third spot S3 is turned on and illuminates another portion of tracking mark 90, and the beams corresponding to spots S1 and S2 are turned off. This allows the beam S3 to provide another signal indicative of the position of the multi-spot beam with respect to the tracking mark 90. As with spot S2 described above, spot S3 is generally turned on for a period of time, referred to as a second sample window, during which it illuminates a portion of the tracking mark 90. At least one sample of the data signal is taken during the second sample window, and provides an indication of the position of spot S3 relative to tracking mark 90. The data signal samples provided by detecting return beams resulting from the application of spots S2 and S3 to a region of the medium including tracking mark 90 are then combined to provide a tracking error signal in accordance with the present invention.

As noted above, it is preferable that the spots S1, S2 and S3 are closely spaced on the medium 46. In the embodiment shown, the spots S2 and S3 are separated center-to-center in an in-track direction by a distance on the order of about 10 μm, which is larger than the length of a tracking mark T. The in-track direction corresponds to direction 92, while the cross-track direction is perpendicular to direction 92. The spots S1, S2 and S3 are separated center-to-center in the cross-track direction by a distance on the order of about 0.5 μm, which is generally less than the track pitch, or distance between adjacent tracks. Of course, the actual spot separation selected in a given application will be a factor of, for example, tracking mark size and shape, track pitch and other dimensions of the storage medium. In the exemplary embodiment of FIGS. 1 and 2, the separation of the three spots at the medium surface in an in-track and cross-track direction may be calculated from the laser diode spacing (LS) within a multi-beam laser diode version of source 32, the focal length F1 of collimating lens 34, the focal length F2 of objective lens 44, and the angle Θ made by the center line of a data track with a line passing through the center of each of the three spots. Those skilled in the art will recognize that, although beam expansion or reduction should also be taken into account in calculating spot separation, in the embodiment of FIG. 1 the beam expansion is in a direction perpendicular to the array of laser diodes in source 32 and therefore does not affect relative spacing. The in-track and cross-track spot separations are then given by the quantity LS*(F2/F1) multiplied by cos(Θ) and sin(Θ), respectively. If LS is 25 μm, F1 is 16 mm, F2 is 4 mm and Θ is 4°, the in-track and cross-track spot separations are about 6.2 μm and 0.4 μm, respectively.

In general, suitable ranges of values for in-track and cross-track spot separation are about 5 to 10 μm and about 0.1 to 1.0 μm, respectively. The actual spot separations chosen may fall outside these ranges and for in-track separation may vary depending upon, for example, the length of the tracking marks and timing considerations. Similarly, the chosen cross-track spot separation may vary depending upon the track pitch and desired gain and cross-talk performance for the tracking error signal.

The spot S1 may be used to both read data from and write data to the optical storage medium 46. In the example of FIGS. 2A–2C, spot S1 therefore remains on at all times other than during the sample windows. As noted above, a tracking sample window is a period of time during detection of a return beam resulting from application of tracking spot S2 or S3 to a portion of a tracking mark, or to a region of the medium which includes the tracking mark. At least one tracking sample is taken within each tracking sample window. During tracking sample windows, spot S1 may be turned off, as in the above-described example, and the two tracking spots S2 and S3 are sequentially turned on over the same region of the media, such as over a given tracking mark T. The tracking error signal is generated by, for example, subtracting the data signal samples taken during the first and second sample windows such that an indication of the relative positions of the second and third spots, and thereby the first spot, is provided.

In a preferred embodiment, samples of the front facet monitor (FFM) signal are also taken during the two sample windows. The FFM signal represents a type of source monitor signal which provides an indication of the intensity level of a radiation beam exiting the front facet of a laser diode optical source. Alternative source monitor signals which may be used in place of the FFM signal include, for example, rear facet monitor signals or any other measures of incident beam intensity level. The FFM signal corresponding to the first radiation beam, which may be an actual detected signal or a sample of the actual detected signal, is designated FFM1. The samples of the FFM signal corresponding to the second and third radiation beams are designated FFM2 and FFM3, respectively. The signal FFM1 may be used to normalize a detected data signal, and/or in a source power servo loop to determine an appropriate laser drive current such that the first beam intensity level is maintained at a desired read or write intensity level. The FFM samples FFM2, FFM3 for the second and third radiation beams, respectively, taken during a given sample window, may be used to determine the appropriate laser drive current for the second and third beams, respectively, during the next sample window and to normalize the data signal samples prior to generating the tracking error signal (TES). If a sample of the data signal produced by the second spot during the first sample window is given by DS2 and a sample of the data signal produced by the third spot during the second sample window is given by DS3, a normalized TES in accordance with the present invention is then given by:

$$TES=(DS2/FFM2)-(DS3/FFM3).$$

As noted above, in alternative embodiments of the present invention, a TES may be generated by simply subtracting the data signal samples DS2 and DS3 without first normalizing to the FFM signal samples FFM2 and FFM3. A data signal, corresponding to the recorded data marks, may be generated using the portion of the return beam resulting from application of the first illumination spot to the medium. If the data signal read by the first spot is given by DS1 and the corresponding FFM signal is given by FFM1, a normalized data signal may be written as DS1/FFM1. The signals DS1 and FFM1 may be the data and FFM signals or samples thereof. DS1, DS2 and DS3 may therefore all be generated from signals detected by the first and second detectors 62, 64 of FIG. 1.

The manner in which the TES of the present invention provides an indication of tracking position will now be described in greater detail with reference to the timing diagram of FIG. 3. The configuration of FIG. 2A corresponds to the state of the signals in the timing diagram of FIG. 3 at time t1. The signals I1, I2 and I3 correspond to the intensity levels of the first, second and third radiation beams, respectively, which produce the first second and third illumination spots, respectively. The signals I1–I3 could also be viewed as, for example, drive signals applied to the respective control inputs of the multi-beam source 32 to generate incident radiation beams at corresponding intensity levels. At time t1, the signal I1 is at a high intensity level 100 and the signals I2 and I3 are at low intensity levels, indicating in the present example that the first radiation beam is on and the second and third radiation beams are off. The signal level 102 within signal FFM corresponds to the signal level detected in the front facet detector 40 in response to the intensity level 100 of the first radiation beam, and therefore varies in accordance with, for example, source noise present on the first radiation beam. In the present example, in which only a single radiation beam is turned on at a given time, the FFM signal tracks the power level of whichever radiation beam is turned on. Up to and shortly after the time t1, the FFM signal thus tracks the intensity I1 of the first radiation beam. The timing diagram of FIG. 3 also shows a data signal which includes pulses 104, 106 and 108. The pulse 104 corresponds to a data signal pulse generated by detecting the return beam reflected from the currently-illuminated data mark 88 in FIG. 2A.

Figure 3:
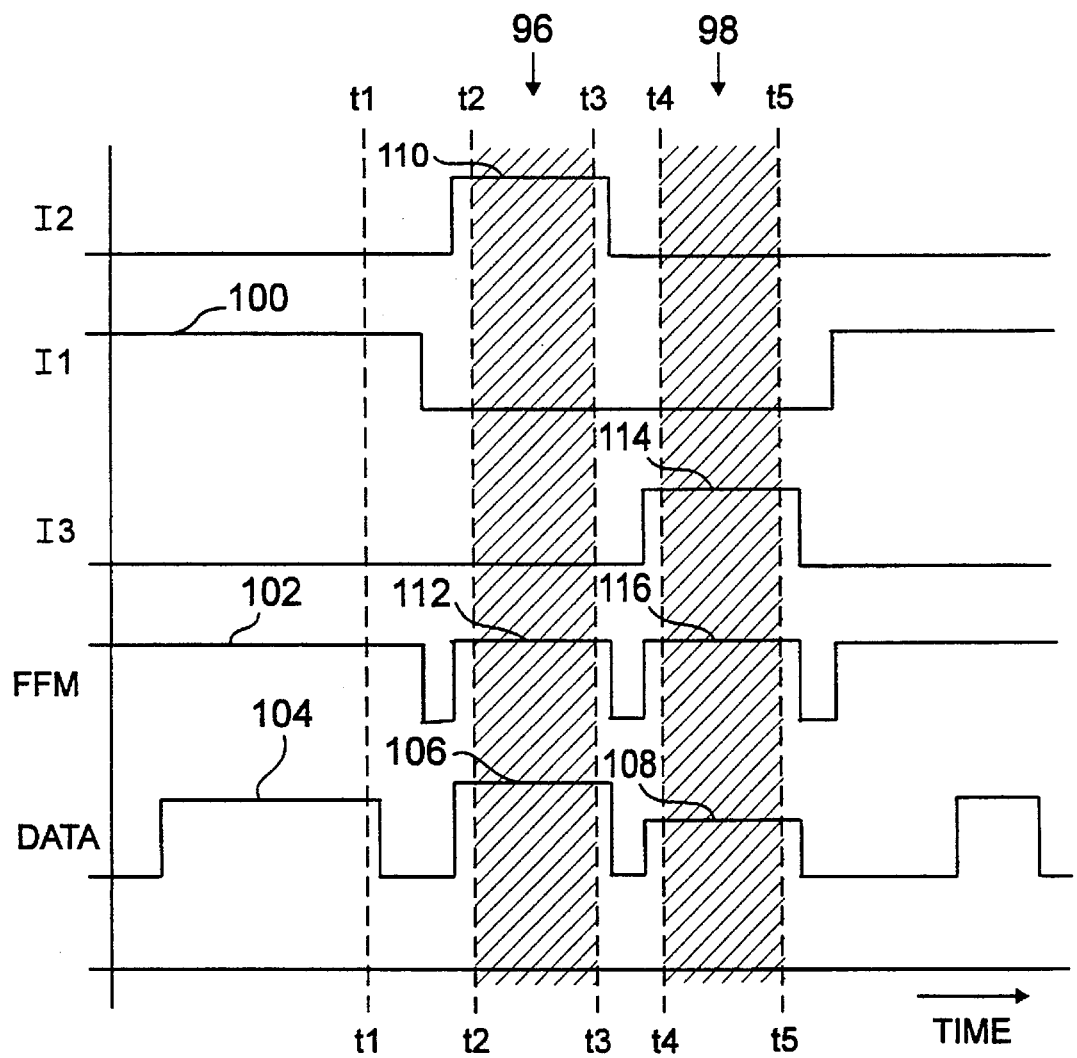
FIG. 3 is an exemplary timing diagram corresponding to the illumination spots shown in FIGS. 2A–2C, showing the manner in which a sampled tracking error signal may be generated in accordance with the present invention from samples of a detected data signal.

An exemplary first sample window 96 is shown between times I2 and I3 in the timing diagram of FIG. 3. The signal I2 includes a pulse 110 which indicates that the intensity level of the second beam is high during the first sample window 96. The intensity signals I1 and I3 are low during this sample window, indicating that their respective radiation beams are off. The pulse 106 in the data signal is generated from a return beam resulting from application of the spot S2 to the tracking mark 90, as shown in FIG. 2B. The amplitude level of the pulse 106 is indicative of the position of spot S2 with respect to the tracking mark 90 and a sample of this amplitude level is used as the quantity DS2 in the above TES equation. The DS2 sample may be normalized to the FFM signal by dividing DS2 by the amplitude of a pulse 112 which is detected by front facet detector 40, and sampled during the first sample window to provide a sample value FFM2 which varies in accordance with the intensity level of the second radiation beam. For illustrative purposes, the amplitudes of pulses 106 and 108 are shown as constant values although the presence of data marks on tracks adjacent tracking mark 90 in the embodiment of FIGS. 2A–2C will generally produce amplitude variations in the pulses.

An exemplary second sample window 98 is shown between times I4 and I5 in the timing diagram of FIG. 3. The signal I3 includes a pulse 114 which indicates that the intensity level of the third beam is high during the second sample window 98. The intensity signals I1 and I2 are low during this sample window, indicating that the first and second beams are off. The pulse 108 is generated from a portion of the return beam resulting from application of the spot S3 to the tracking mark 90. The amplitude level of the pulse 108 is indicative of the position of spot S3 with respect to the tracking mark 90 and is used as the sample DS3 in the above TES equation. The DS3 sample may be normalized to the FFM signal by dividing DS3 by the amplitude of a pulse 116 which is detected by front facet detector 40, and sampled during the first sample window to provide a sample value FFM2 which varies in accordance with the intensity level of the third radiation beam. The sample windows 96, 98 are exemplary only, and in other embodiments could be shorter or longer. Further, several samples could be taken in each window and processed by, for example, averaging or determining a minimum amplitude value, to provide the sample used in generating the TES. A first set of samples taken during the first sample window thus may be processed to generate the first data signal sample, and a second set of samples taken during the second sample window may be processed to generate the second data signal sample. Any of a number of alternative sample processing techniques, other than averaging or determining a minimum value, will be apparent to those skilled in the art and may be used to obtain the first and second data signal samples herein.

When the incident beam corresponding to spot S1 is in an off-track position, the spot S2 or S3 which is more centered on the desired data track would provide a sample DS2 or DS3, respectively, having the higher amplitude. The example illustrated in the timing diagram of FIG. 3 indicates that the amplitude of pulse 106, corresponding to sample DS2, is higher than that of pulse 108, corresponding to sample DS3, and therefore the spot S1 is off-track in the direction of data track n+1. In the embodiment shown, a positive TES will thus correspond to spot S1 being off-track in the direction of track n+1 and a negative TES will correspond to the spot S1 being off-track in the direction of track n−1. If the TES is zero, the amplitude of data signal samples DS2 and DS3 are the same, indicating that the spot S1 is properly positioned on the desired data track. The amplitude levels of pulses 106, 108 in FIG. 3 are exemplary only and do not correspond to the actual spot positions shown in FIGS. 2B and 2C.

The effects of neighboring data marks on the TES may be minimized in the manner described below. Neighboring data marks include those on adjacent tracks on either side of a tracking mark T. Data tracks n+1 and n−1 are the neighboring data tracks of data track n. As previously noted, the data marks on tracks n+1 and n−1 adjacent tracking mark 90 of track n may cause variation in the amplitude of the data signal pulses 106 and 108 by reflecting additional incident radiation from spot S2 or S3. This variation may in turn influence the above-described TES. The effects of these neighboring data marks may be minimized by, for example, using the lowest amplitude levels detected within pulses 106 and 108 as the data signal samples in the calculation of the TES. The lowest amplitude level will generally correspond to spot S2 or S3 positioned in a gap between adjacent neighboring data marks on the same track, as spot S3 is positioned in FIG. 2C. Using the lowest amplitude values for the detected data signal samples DS2 and DS3 will ensure that the TES is derived primarily from components associated with reflection of spots S2 and S3 from a tracking mark rather than from the neighboring data marks. There will usually be a gap between neighboring data marks, giving rise to an amplitude minimum in the data signal pulses 106 and 108, because the tracking marks are generally designed to be longer than the longest data marks. Of course, the effect of neighboring data marks could also be minimized by spacing adjacent data tracks further apart on the medium.

It should be understood that it is not necessary to completely turn off the first radiation beam corresponding to spot S1 when the tracking signal is generated from the spots S2 and S3. In other embodiments of the present invention, for example, the use of unwritten guard bands around the tracking marks would allow the beam corresponding to spot S1 to remain on and its contribution to data signal samples DS2 and DS3 would be substantially cancelled out in the tracking error signal generation described above. As noted above, however, it is generally preferable to turn off the second and third beams when data is being read from or recorded on the medium using the first beam.

Figure 4:
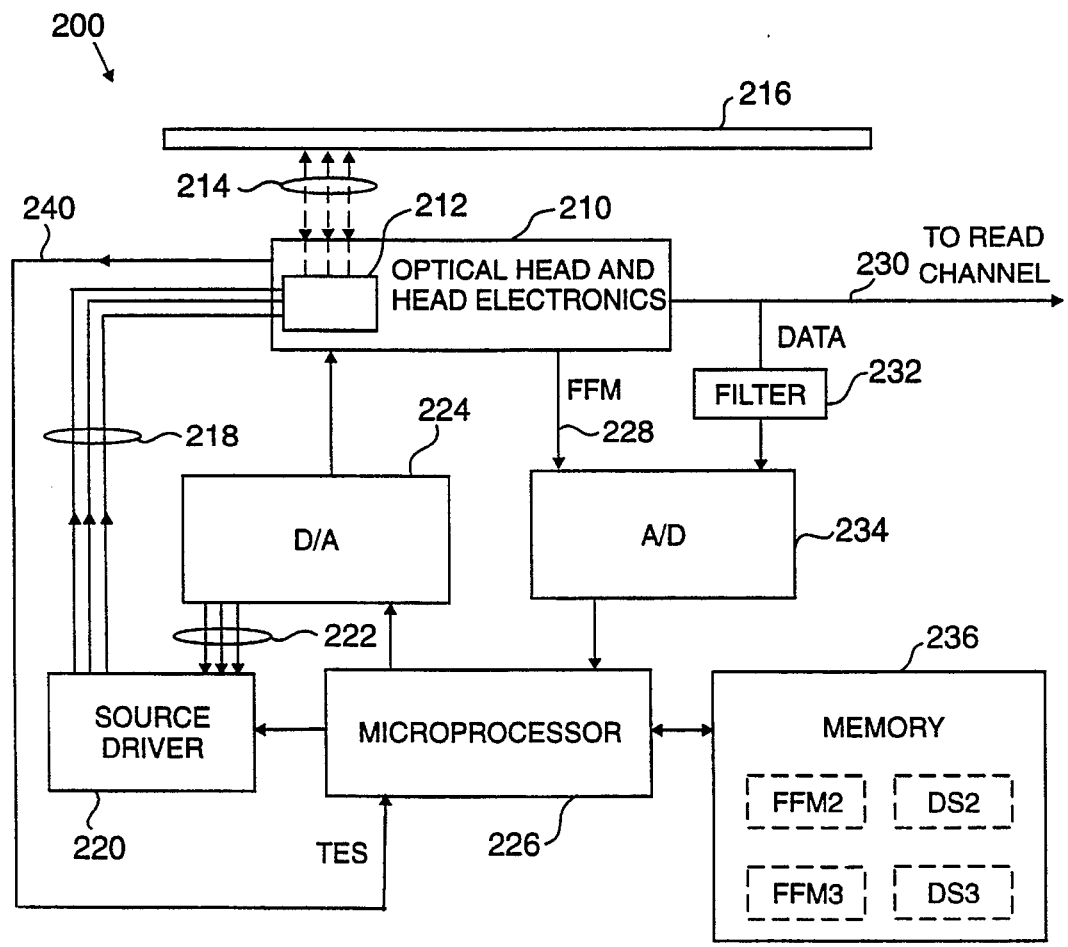
FIG. 4 is a block diagram of an optical system in accordance with the present invention, illustrating exemplary sampling, control and signal processing elements.

FIG. 4 is a block diagram of an optical data storage system 200 illustrating exemplary control elements suitable for providing the multi-spot differential tracking described above in conjunction with FIGS. 1–3. The system 200 includes an optical head 210 which may include the optical components shown in FIG. 1 as well as additional signal combining and/or processing electronics. The optical head 210 includes an optical source 212 which provides a multi-spot incident radiation beam 214 to an optical storage medium 216. The source 212 may be, for example, the three-beam laser diode version of source 32 in FIG. 1. The source 212 is supplied with control signals via lines 218 from a source driver 220. The control signals are supplied to source driver 220 over lines 222 from a microprocessor 226 via a digital-to-analog (D/A) converter 224. The microprocessor 226 supplies control signals which may be used to turn on and off the beams in the multi-spot incident beam, and to set the desired intensity level for each beam. The source 212 and source driver 220 may be portions of an application-specific integrated circuit (ASIC), such as that described in U.S. patent application Ser. No. 08/234,446, filed Apr. 28, 1994 and entitled "Integrated Laser Module," which is assigned to the assignee of the present invention and incorporated by reference herein.

The optical head 210 generates an FFM signal on line 228 and a data signal on line 230 in the manner previously described. The data signal is supplied to a read channel (not shown) which further processes the read-out data. The data signal is also passed through a filter 232 and supplied with the FFM signal to an analog-to-digital (A/D) converter 234. The filter 232 is optional and may, for example, limit the data signal bandwidth to the sampling bandwidth needed for proper generation of the TES. The digitized FFM and data signals are supplied to microprocessor 226. The microprocessor 226 samples the digitized FFM and data signals to determine appropriate FFM and data signal samples FFM2, FFM3, DS2 and DS3. The samples may be stored by the microprocessor 226 in a memory 236, and supplied to signal combining electronics in the optical head 210 in order to generate a TES. The TES is supplied via line 240 back to the microprocessor 226 to allow closed-loop tracking adjustments to be made by, for example, directing appropriate movement of an objective lens actuator (not shown) in the optical head 210. Alternatively, the TES may be generated within the microprocessor 226 and then supplied to the actuator in the optical head. Any of a number of alternative arrangements may be used to control and process the multi-spot radiation beam to provide sampled tracking in accordance with the present invention.

In the system 200 of FIG. 4, A/D converter 234 and microprocessor 226 represent an exemplary means for sampling the data signal to obtain the first and second data signal samples. Alternative sampling means include, for example, sample-and-hold circuits. Microprocessor 226 also represents an exemplary means for generating a TES from the data signal samples, and may be considered a signal combiner which combines the first and second data signal samples, in the manner described above, to generate a TES. Alternative means for generating a TES include any of a number of different signal combining circuits. Although in the embodiments described above, the data signal samples are combined by subtracting them, alternative signal combiners could be used which, for example, divide or sum the data signal samples to provide a TES.

The present invention may also be used in systems which utilize different numbers of radiation beams. For example, the above-described techniques could be readily adapted to systems with two beams. In such a system, a tracking mark T and a data mark D to be written or read could be slightly offset in the cross-track direction, such that a TES could then be generated using only a single tracking spot S2 or S3. As an example of a multi-beam system with more than three beams, the present invention could be applied to multi-channel optical data storage systems which utilize m separate beams to read and/or record data on m distinct channels of an optical storage medium. The teachings of the present invention could be readily applied to such an m-channel system by, for example, including tracking spots similar to spots S2 and S3 around the read/write beam spot of one or more of the m channels. Such a system could include, for example, a total of m+2 beams, with m beams used for read/write functions and two beams used for generating spots S2 and S3, and a tracking error signal, in the manner described above. Of course, in other embodiments each of the m channels could be supplied with its own pair of tracking spots S2 and S3.

An alternative embodiment of the present invention uses a single-beam source for optical source 32 and includes an acousto-optical modulator, an electro-optical deflector, or other device capable of varying the position of an illumination spot produced by a single incident beam. The modulator, deflector or other device is placed in the optical path of the incident radiation beam, and may be suitably controlled in a known manner such that the position of the illumination spot produced by the incident beam changes with respect to the medium when a tracking mark is encountered. The modulator or deflector is normally configured such that the incident radiation beam produces spot S1. The incident beam position can then be shifted such that it produces spot S2 when the spot position corresponding to spot S2 coincides with a tracking mark. The incident beam position is again shifted to produce spot S3 when the spot position corresponding to spot S3 coincides with the tracking mark. Finally, the incident beam is shifted back to again provide spot S1. These beam position shifts are repeated each time a tracking mark is encountered. Those skilled in the art can readily configure and control either an acousto-optical modulator, electro-optical deflector, or other suitable beam positioning device to provide the illumination spots S1, S2 and S3 at different times using a single radiation beam.

The embodiments of the present invention described above are capable of generating a sampled differential tracking error signal from non-grooved magneto-optic storage medium in an optical data storage system. Although particularly well-suited for use with non-grooved magneto-optic media, the present invention may also provide improvements in other optical storage system applications, including, for example, systems utilizing write-once media or multifunction optical disk drives capable of tracking different types of media using the same tracking technique. Furthermore, many variations may be made in the arrangements shown, including, for example, the type of magneto-optic or other medium used, the size, shape and arrangement of tracking marks on the medium, the manner in which the detected signals are combined to generate data and tracking error signals, and the type and arrangement of optical components used for directing and processing the incident and return radiation beams in the optical system. These and other alternatives and variations will be readily apparent to those skilled in the art.

| PARTS LIST | |
|---|---|
| D | data mark |
| DS1 | data signal |
| DS2, DS3 | data signal samples |

| PARTS LIST (continued) | |
|---|---|
| FFM1 | front facet monitor signal |
| FFM2, FFM3 | front facet monitor signal samples |
| I1, I2, I3 | radiation beam intensity signals |
| n, n − 1, n + 1 | data tracks |
| T | tracking mark |
| S1, S2, S3 | illumination spots |
| t1–t5 | time |
| 30 | optical data storage system |
| 31 | source driver |
| 32 | optical source |
| 33 | circularizing lens |
| 34 | collimating lens |
| 36 | polarization beam splitter |
| 37 | surface |
| 38 | detector focusing lens |
| 40 | front facet detector |
| 44 | objective lens |
| 46 | optical storage medium |
| 46A | data storage surface |
| 46B | transparent substrate |
| 50 | polarization beam splitter |
| 51 | beam splitter surface |
| 52 | detector focusing lens |
| 54 | detector array |
| 56 | lens |
| 58 | general waveplate |
| 60 | polarization beam splitter |
| 61 | beam splitter surface |
| 62 | first detector |
| 64 | second detector |
| 68 | differential amplifier |
| 80 | data tracks |
| 88 | data mark |
| 90 | tracking mark |
| 92 | direction of media movement |
| 96 | first sample window |
| 98 | second sample window |
| 100 | first radiation beam intensity level |
| 102 | FFM signal level |
| 104, 106, 108 | data signal levels |
| 110 | second beam intensity level |
| 112 | FFM signal level |
| 114 | third beam intensity level |
| 116 | FFM signal level |
| 200 | optical data storage system |
| 210 | optical head |
| 212 | optical source |
| 214 | multi-spot incident radiation beam |
| 216 | optical storage medium |
| 218 | source control lines |
| 220 | source driver |
| 222 | source control lines |
| 224 | digital-to-analog converter |
| 226 | microprocessor |
| 228 | FFM signal line |
| 230 | data signal line |
| 232 | filter |
| 234 | analog-to-digital converter |
| 236 | memory |
| 240 | tracking error signal line |

I claim:

1. An apparatus for use in an optical data storage system in which data is stored in a data track on an optical storage medium to generate a tracking error signal, the apparatus comprising:

an optical source to generate radiation which is applied to the medium to produce a first illumination spot, a second illumination spot and a third illumination spot thereon;

means for generating a single data signal from a return beam resulting from application of the radiation to the medium;

means for sampling the data signal to obtain a first data signal sample when the second spot illuminates a first region of the medium and a second data signal sample when the third spot illuminates a second region of the medium; and means for generating from the first and second data signal samples the tracking error signal indicative of the position of the first spot relative to the data track of the medium.

2. The apparatus of claim 1 wherein the optical storage medium includes a number of preformatted tracking marks thereon.

3. The apparatus of claim 2 wherein the first region of the medium is a portion of a given tracking mark and the second region of the medium is another portion of the given tracking mark.

4. The apparatus of claim 1 wherein the optical source is a multi-beam laser diode generating a first radiation beam to produce the first illumination spot on the medium, a second radiation beam to produce the second spot and a third radiation beam to produce the third spot.

5. The apparatus of claim 4 wherein the first radiation beam is at an increased intensity level and the second and third beams are at a substantially reduced intensity level for a period of time during which the first spot illuminates data marks on the data track of the medium.

6. The apparatus of claim 4 wherein the second radiation beam is at an increased intensity level and the third radiation beam is at a substantially reduced intensity level for a period of time during which the second spot illuminates a portion of a tracking mark on the medium, and further wherein the third radiation beam is at an increased intensity level and the second radiation beam is at a substantially reduced intensity level for a period of time during which the third spot illuminates another portion of a tracking mark on the medium.

7. The apparatus of claim 1 wherein the means for generating a data signal from the return beam further includes:

a first detector adapted to receive a first polarization component of the return beam and to generate a first detected signal therefrom;

a second detector adapted to receive a second polarization component of the return beam and to generate a second detected signal therefrom; and a signal combiner adapted to receive the first and second detected signals and to generate the data signal therefrom.

8. The apparatus of claim 7 wherein the signal combiner is a differential amplifier having a first input and a second input connected to the first and second detectors, respectively, and having an output corresponding to a difference between the first and second polarization components of the return beam.

9. The apparatus of claim 1 wherein the means for generating a tracking error signal includes a signal combiner which generates a tracking error signal corresponding to an amplitude difference between the first and second data signal samples.

10. The apparatus of claim 1 wherein the means for sampling the data signal obtains a first set of data signal samples when the second spot illuminates a portion of a tracking mark on the medium, and a second set of data signal samples when the third spot illuminates another portion of a tracking mark.

11. The apparatus of claim 10 wherein the first and second data signal samples correspond to an average of the data signal samples in the first and second sets, respectively.

12. The apparatus of claim 10 wherein the first and second data signal samples correspond to a minimum amplitude sample in the first and second sets, respectively.

13. The apparatus of claim 1 further including a circularizing lens arranged in a path of the radiation between the optical source and the medium.

14. The apparatus of claim 1 further including a source monitor detector arranged to receive a portion of the radiation from the optical source and to generate a source monitor signal therefrom, and wherein the source monitor signal is sampled to provide first and second source monitor signal samples corresponding to the first and second data signal samples, respectively.

15. The apparatus of claim 14 wherein the first and second data signal samples are normalized to the first and second source monitor signal samples corresponding to the first and second data signal samples, respectively.

16. A tracking method for use in an optical storage system in which data is stored in a data track on an optical storage medium to generate a tracking error signal, the method comprising the steps of:

generating radiation to produce a first, a second and a third illumination spot on the medium;

detecting a return beam resulting from application of the radiation to the medium;

generating a single data signal from the detected return beam;

sampling the data signal when the second spot illuminates a first region of the medium to obtain a first data signal sample;

sampling the data signal when the third spot illuminates a second region of the medium to obtain a second data signal sample; and generating from the first and second data signal samples the tracking error signal indicative of the position of the first spot relative to the data track of the medium.

17. The method of claim 16 wherein the step of generating radiation to produce the illumination spots on the medium further includes the steps of:

providing a multi-beam optical source to generate a first radiation beam, a second radiation beam and a third radiation beam; and applying the first, second and third radiation beams to the medium such that the first illumination spot is produced on the medium by the first beam, the second spot is produced on the medium by the second beam, and the third spot is produced by the third radiation beam.

18. The method of claim 17 further including the steps of:

providing the first radiation beam at an increased intensity level and the second and third beams at a substantially reduced intensity level for a period of time during which the first spot illuminates data marks on a data track of the medium;

providing the second radiation beam at an increased intensity level and the third radiation beam at a substantially reduced intensity level for a period of time during which the second spot illuminates a portion of a tracking mark on the medium; and providing the third radiation beam at an increased intensity level and the second radiation beam at a substantially reduced intensity level for a period of time during which the third spot illuminates another portion of a tracking mark.

19. The method of claim 16 further including the steps of:

detecting a portion of the radiation;

generating a source monitor signal therefrom;

sampling the source monitor signal to provide first and second source monitor signals corresponding to the first and second data signal samples, respectively; and normalizing the first and second data signal samples to the corresponding first and second source monitor signal samples, respectively.

20. The method of claim 16 wherein the steps of detecting the return beam and generating the data signal further include:

separating the return beam into a first polarization component and a second polarization component;

detecting the first polarization component of the return beam to generate a first detected signal;

detecting the second polarization component of the return beam to generate a second detected signal; and generating the data signal from the first and the second detected signals.

21. The method of claim 16 wherein the steps of sampling the data signal to obtain first and second data signal samples further include:

sampling the data signal to obtain a first set of samples when the second spot illuminates a portion of a tracking mark on the medium;

sampling the data signal to obtain a second set of samples when the third spot illuminates another portion of a tracking mark; and processing the first and second sets of samples to obtain the first and second data signal samples, respectively.

22. The method of claim 21 wherein the step of processing the first and second sets of samples includes taking an average of the samples in each set.

23. The method of claim 21 wherein the step of processing the first and second sets of samples includes determining a minimum amplitude sample in each set.

* * * * *